US012810564B2

(12) United States Patent
Gupta et al.

(10) Patent No.: US 12,810,564 B2
(45) Date of Patent: Nov. 24, 2026

(54) METHOD AND SYSTEM FOR CREATING VIRTUAL EVENT SPACE

(71) Applicant: Accenture Global Solutions Limited, Dublin (IE)

(72) Inventors: Anshul Gupta, Gurgaon (IN); Alok Behera, Bengaluru (IN); Chinu Subudhi, Bengaluru (IN); Dhruvil Bavishi, Sanand (IN); RBSanthosh Kumar, Bangalore (IN); Ravi Kant Gaur, Bangalore (IN); Rahul Kumar, Mumbai (IN); Vishwas, Surathkal (IN)

(73) Assignee: Accenture Global Solutions Limited, Dublin (IE)

( * ) Notice: Subject to any disclaimer, the term of this patent is extended or adjusted under 35 U.S.C. 154(b) by 116 days.

(21) Appl. No.: 19/055,941

(22) Filed: Feb. 18, 2025

(65) Prior Publication Data

US 2026/0245316 A1 Aug. 20, 2026

(51) Int. Cl.

*G06T 19/00* (2011.01)
*G06Q 10/101* (2023.01)

(52) U.S. Cl.

CPC ......... *G06T 19/006* (2013.01); *G06Q 10/101* (2013.01); *G06T 2210/04* (2013.01)

(58) Field of Classification Search

None
See application file for complete search history.

(56) References Cited

U.S. PATENT DOCUMENTS

| | | | | |
|---|---|---|---|---|
| 10,181,218 | B1 * | 1/2019 | Goetzinger, Jr. | G06F 3/0486 |
| 11,170,465 | B1 * | 11/2021 | Feimster | G06T 19/006 |
| 2019/0164340 | A1 * | 5/2019 | Pejic | G06T 19/20 |

* cited by examiner

*Primary Examiner* — Robert J Craddock
(74) *Attorney, Agent, or Firm* — Seed Intellectual Property Law Group LLP

(57) ABSTRACT

A method for creating virtual event space is disclosed. The method includes receiving inputs including dimensions of a space, a number of participants, types of the participants, and a set of predefined layouts for the event. Further, an augmented reality session is initiated, displaying a object in the space. The objects are arranged in a default configuration based upon the set of the predefined layouts. The layout is identified and selected based upon the types and the number of participants. The space can be customized by adding and configuring digital artifacts for lights, chairs, tables, a stage, wall decorations, and/or speakers in the partial area of the space. Consequently, an event plan is created and can be shared with a stakeholder of the event. The event plan includes the space for displaying and receiving further inputs from the stakeholder for finalizing an actual physical event space.

20 Claims, 9 Drawing Sheets

METHOD AND SYSTEM FOR CREATING VIRTUAL EVENT SPACE

TECHNICAL FIELD

Various examples described herein relate generally to creating a virtual event space. Specifically, disclosed examples are directed to a method and a system for creating the virtual event space in a three-dimensional visualization in an augmented reality (AR) session.

BACKGROUND

Event planning is a critical function across diverse industries and value chains. Event planning encompasses a spectrum of activities ranging from proactive planning to reactive ad-hoc responses. This multifaceted process necessitates meticulous consideration, extending beyond a mere selection of a venue to encompass a comprehensive range of logistical and operational aspects. The dynamic landscape of event management is currently undergoing a transformative shift, driven by the synergistic integration of artificial intelligence (AI) and augmented reality (AR).

Generative AI (GenAI), a subfield of AI, empowers the creation of novel content, including but not limited to images, music, text, and complex designs, exhibiting human-like creative capabilities. Conversely, augmented reality (AR) functions by overlaying digital information onto the user's perception of the real world, thereby enhancing their understanding and interaction with their environment.

The integration of GenAI and AR significantly enhances event experiences. By leveraging the creative capabilities of GenAI and the immersive potential of AR, a novel paradigm emerges where digital and physical environments seamlessly integrate. This convergence empowers users with unprecedented experiential possibilities, enabling a unique fusion of virtual and real-world interactions.

SUMMARY

Implementations of the present disclosure are generally directed to creating a virtual event space. More particularly, implementations of the present disclosure are directed to for creating three-dimensional visualization in augmented reality (AR) session of the virtual event space, using computational theory, AI/ML, and distributed computing systems.

In general, innovative aspects of the subject matter described herein provide a method for creating a virtual event space for acceptance, adoption, sharing and validation, by the user. The method may include receiving inputs including dimensions of a space, a number of participants, one or more types of the participants, and a set of predefined layouts for the event. Further, the method may include initiating an augmented reality session displaying a plurality of objects in at least a partial area of the space. Herein, the plurality of objects includes one or more objects arranged in a default configuration based upon a layout of the set of the predefined layouts, wherein the layout of the set of the predefined layouts is identified and selected based upon the one or more type of participants, and the number of participants. Thereafter, the method may include customizing at least the partial area of the space by adding and configuring one or more digital artifacts for lights, chairs, tables, a stage, wall decorations, and/or speakers in the partial area of the space. Moreover, the method may include sharing, with a stakeholder of the event, an event plan specifically created for the stakeholder, wherein the event includes at least the customized partial area of the space for displaying and receiving further inputs from the stakeholder for finalizing an actual physical event space.

The present disclosure further describes a system for implementing the method provided herein. The present disclosure also describes non-transitory computer-readable medium (CRM) coupled to one or more processors and having machine-executable instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the provided aspects and features.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Various examples in accordance with the present disclosure will be described with reference to the drawings, in which.

Like reference numbers and designations in the various drawings indicate like elements.

DETAILED DESCRIPTION

Figure 1:
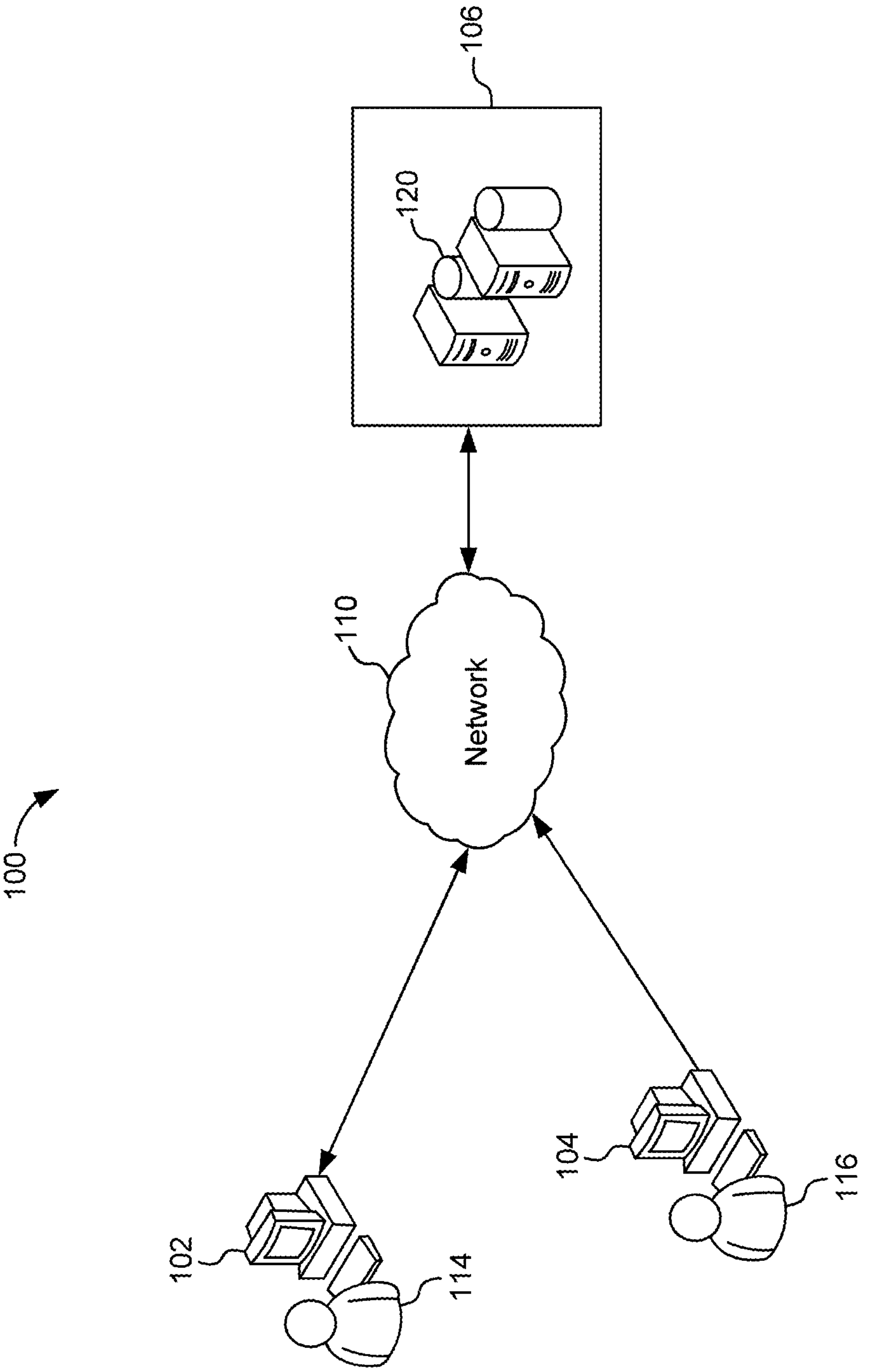
FIG. 1 illustrates an example environment used to execute implementations of the present disclosure.

In the following description, various examples will be illustrated by way of example and not by way of limitation in the figures of the accompanying drawings. References to various examples in this disclosure are not necessarily to the same example, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" (e.g., "for example", "an example of", "by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A. and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures, and techniques may be shown without unnecessary detail in order to avoid obscuring details of the examples.

The specification and drawings are to be regarded in an illustrative rather than a restrictive sense. It will, however, be evident that various modifications and changes may be made thereunto without departing from the broader spirit and scope of the invention as set forth in the claims.

Event Planning requires a lot of planning, not just off the venue but on the venue. For example, for organizing a conference, user would look for a hall, look how the seating and decor would look like, how the food will be arranged, audio settings, etc. The arrangements can be more elaborate.

Traditional event planning approaches (hereinafter referenced to as traditional methods), characterized by manual processes and limited digital tools, present several significant challenges. The traditional methods rely on static representations, such as images or physical mockups, which hinders the exploration of dynamic and iterative design options. The physical mockups include significant resources associated with materials, labor, and logistics. Additionally, setting up and dismantling the physical mockups can be resource-intensive and time-consuming. Moreover, user interaction is limited to providing initial requirements and approving final plans. Real-time collaboration and iterative feedback are generally restricted. Further, communicating complex spatial layouts and arrangements to stakeholders can be challenging and time-consuming, leading to misinterpretations and/or delays. In the traditional methods, exploring multiple layout options and/or making changes are difficult. That is, the traditional methods offer limited customization options, relying heavily on rigid templates and pre-defined layouts, restricting user creativity and flexibility in designing unique event experiences. Furthermore, the traditional methods lack the ability to provide real-time, immersive visualizations of the planned space, hindering user understanding and engagement. In other words, traditional methods often lack immersive and interactive elements, such as augmented or virtual reality experiences, which can significantly enhance user engagement and understanding of the planned event space. Moreover, user input is generally limited to the final stages of the planning process, hindering iterative design and potentially leading to rework. Additionally, traditional methods often lack effective mechanisms for real-time communication and collaboration among multiple stakeholders. That is, sharing and collaborating on event plans can be cumbersome and inefficient in the traditional methods. Limitations in sharing capabilities hinder effective communication and feedback among stakeholders. In addition, the traditional methods have limited spatial analysis capabilities, making it difficult to identify and address potential issues or anomalies in the planned space.

Furthermore, traditional methods often have a steep learning curve, requiring significant user training and expertise to effectively utilize their features and functionalities. The traditional methods struggle to accurately interpret and represent spatial relationships and constraints. This can lead to the generation of invalid layouts, such as objects overlapping, incorrect object placements, or violations of physical constraints. Traditional methods lack surface understanding, that is, when dealing with 3D models or virtual environments, limitations in surface understanding can result in the generation of invalid geometries, such as non-manifold surfaces, missing faces, or incorrect surface normals. Furthermore, traditional methods fail to adequately address the temporal aspects of event planning, such as scheduling, time-bound activities, and the dynamic evolution of the event over time. there is a lack of proper replication/consistency management in the traditional methods. Challenges in maintaining consistency and replicating event plans across different devices and platforms can hinder collaboration and lead to data discrepancies.

Therefore, to address afore-mentioned challenges, there is a need for method and system that can provide an intuitive workflow for event planning, allowing for iterative design and exploration. Specifically, the method and system are needed that is highly customizable, allowing users to tailor the event plan to their specific requirements, enable seamless sharing and transmission of the event plan among stakeholders and leverage virtual and interactive elements to enhance the planning process.

Implementations of the present disclosure discloses a solution, including a method and a system for creating three-dimensional (3D) visualization in augmented reality (AR) session of the virtual event space, using computational theory, artificial intelligence (AI)/machine learning techniques (ML), and distributed computing systems, to overcome above mentioned drawbacks of the traditional methods. The computational theory encompasses techniques for processing and manipulating data, such as spatial data, geometry, and simulations. The AI/ML techniques are implemented for tasks such as, 3D Model Generation, understanding and predicting spatial relationships between objects and people and interpreting user inputs and adapting the AR session accordingly. Distributed computing systems includes use of distributed computing architecture, where processing tasks are distributed across multiple devices or servers. Thus, performance, scalability, and responsiveness may be enhanced, especially when dealing with complex 3D visualizations and real-time interactions. The method and system enable users to plan, arrange, schedule, and share events through an interactive AR session. Initially, the user provides essential input parameters, including the dimensions of the event space, the number and type of participants, and selects from a predefined set of event layouts. Based on these inputs, an AR session is initiated displaying a physical space associated with the event. The AR session dynamically places a set of default virtual objects, such as chairs, tables, and a stage, according to the selected layout, dimensions, and participant count.

Furthermore, the method and system allow users to customize the event space through the AR session by adding and configuring digital artifacts, such as lights, decorations, and audio equipment. This customization enables the users to refine the initial layout to meet specific requirements and preferences.

Once the desired layout is achieved, the event plan can be shared with stakeholders. This sharing mechanism includes not only the event schedule and details but also recording of the complete AR session, capturing the virtual objects and their arrangement within the physical space. This enables stakeholders to visualize the proposed event plan in a realistic and interactive manner, facilitating effective review and approval.

The proposed solution in the present disclosure introduces a paradigm shift in event planning by enabling faster event planning cycles and reduced time-to-market. Eliminating the need for physical props and mock-ups significantly streamlines the process. By leveraging Generative AI (GenAI), the method and system can generate a diverse range of creative layout options for the event within short timeframes, facilitating rapid exploration and iteration. The proposed solution exhibits high scalability by dynamically adding numerous layouts and layout types. Moreover, the proposed solution incorporates advanced techniques such as computer vision and computational geometry to automatically generate layouts from existing floor plans, drawings, and/or images, enhancing adaptability and efficiency.

Moreover, the proposed solution enhances user experience by enabling the dynamic generation of theme-based brand wallpapers using GenAI, adding an extra layer of customization and visual appeal. Furthermore, the proposed solution facilitates seamless collaboration and knowledge sharing by enabling persistent saving and sharing of both the physical space representation and the user-generated digital artifacts. A computation module may employ techniques such as spatial analysis and physical simulation to create a highly realistic and immersive AR experience, minimizing a gap between the previewed layouts and their real-world counterparts.

The proposed solution aims to create an intuitive and user-friendly interface with clear instructions and guidance. This, combined with the use of AI-powered assistants and contextual help, can significantly reduce the learning curve and make the platform accessible to users with varying levels of technical expertise. The proposed solution leverages AR/VR technologies to provide immersive and interactive experiences. Users can visualize the event space in real-time, interact with virtual objects, and experience the event as if they were physically present. This enhances user understanding and engagement. Moreover, the integration of AI-powered spatial reasoning and semantic analysis facilitate interpretation of spatial relationships and constraints effectively. Thus, accurate layouts are generated by identifying and preventing spatial anomalies such as object collisions, inadequate spacing, and violations of safety regulations. In the proposed solution, the use of advanced surface analysis techniques, enables the system to accurately process and represent 3D surfaces. Therefore, ensuring that the generated models are geometrically correct, free of errors, and suitable for downstream applications such as 3D printing or VR simulations. The proposed solution implements robust temporal management capabilities, allowing users to schedule events, define time-bound activities, and track the progress of the event over time. This enables more efficient event planning and execution and helps to avoid scheduling conflicts and logistical issues. In the proposed solution, generated event plans are consistently replicated and synchronized across different devices and platforms, thereby minimizing data discrepancies and facilitating seamless collaboration among stakeholders.

Thus, using GenAI and advanced techniques, as described herein, more intelligent layout optimization may be achieved. AI-powered tools can identify and correct potential issues in the layout, such as overlapping objects, inadequate spacing, and safety hazards, ensuring a safe and functional event space, without requiring additional time and other resources. Further, in the present disclosure, historical data and user preferences can be analyzed to predict potential challenges and to optimize the layout accordingly. Personalized layouts can be generated based on individual user preferences and requirements, such as seating arrangements, accessibility needs, and/or desired ambiance. The use of AR and/or virtual reality and interactive design tools empowers users to actively participate in the design process, making the planning experience more engaging and collaborative. Furthermore, the proposed solution enables real-time collaboration among multiple stakeholders, facilitating seamless communication and feedback. Virtual workspaces can be created for each event, allowing stakeholders to access and modify the event plan from anywhere. Users can take virtual walkthroughs of the event space to gain a better understanding of the layout and identify potential issues.

Moreover, data, can be collected on user interactions, event performance, and visitor feedback to gain valuable insights into event planning trends and user preferences. The collected data can be used to make data-driven decisions and improve future event planning efforts.

In essence, the proposed solution addresses the limitations of traditional methods by incorporating advanced techniques such as, spatial languages, computational geometry, NLP, spatial computing, entropy, surface languages, symbolic AI, GenAI and distributed computing systems. Moreover, the proposed solution focus on user experience, and providing a comprehensive set of features for spatial reasoning, temporal management, and collaborative design. This results in a more efficient, accurate, and user-friendly event planning experience.

FIG. 1 depicts an example environment 100 that can be used to execute implementations of the present disclosure. In some examples, the example environment 100 enables users associated with respective systems to execute requests to generate content by invoking a trained language model in accordance with implementations of the present disclosure. The example environment 100 includes computing devices 102 and 104, back-end system 106, and a network 110. In some examples, the computing devices 102 and 104 are used by respective users 114 and 116 to log into and interact with the back-end system 106 and applications executing on the back-end system 106 according to implementations of the present disclosure.

As shown in FIG. 1, the computing devices 102 and 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites (e.g., web applications executing on the back-end system 106), user devices (e.g., the computing devices 102, 104), and the back-end system 106. In some examples, the network 110 can be accessed over a wired and/or a wireless communications link. For example, mobile computing devices, such as smartphones can utilize a cellular network to access the network 110.

While only one back-end system 106 is shown in FIG. 1, there may be more than one back-end system 106, and each of the back-end systems 106 includes at least one server system 120. In some examples, the server system 120 hosts one or more computer implemented services that users 114 and/or 116 can interact with by using the computing devices 102 and/or 104, respectively. For example, components of enterprise systems and applications can be hosted on one or more of the back-end system 106. In some examples, the back-end system 106 can be provided as an on-premises system that is operated by an enterprise or a third-party taking part in cross-platform interactions and data management. In some examples, the back-end system 106 can be provided as an off-premises system (e.g., cloud or on-demand) that is operated by an enterprise or a third-party on behalf of an enterprise.

In some examples, the computing devices 102 and 104 each include computer executable applications executed thereon. In some examples, the computing devices 102 and 104 each include a web browser application executed thereon, which can be used to display one or more web pages of applications executing on the back-end system 106. In some examples, each of the computing devices 102 and 104 can display one or more GUIs that enable the respective users 114 and 116 to interact with the back-end system 106. In accordance with implementations of the present disclosure, the back-end system 106 may host enterprise applications or systems that require data sharing and data privacy. In some examples, the computing device 102 and/or the computing device 104 can communicate with the back-end system 106 over the network 110.

In some implementations, the back-end system 106 can be implemented in a cloud environment. The back-end system 106 includes at least one server system (or server) 120. In the example of FIG. 1, the back-end system 106 can include various forms of servers including, but not limited to, a web server, an application server, a proxy server, a network server, and/or a server pool. In general, server systems accept requests for application services and provide such services to any number of client devices (for example, the computing device 102 over the network 110).

In some implementations, the back-end system 106 can be used to create three-dimensional (3D) visualization in an augmented reality (AR) session of the virtual event space.

In an example, the user 114 or 116 may raise a new event organization request via the computing device 102 or 104, respectively. The planner (planner may refer to another user using the back-end system 106) may view the required event details on the application executing on the back-end system 106. The planner may then select a pre-existing event layout and initiate an augmented reality (AR) session. Specifically, on the back-end system 106, the AR session is started, and the planner may scan the entire physical space. A corresponding virtual space may be generated on the back-end system 106. The planner may, thereafter, organize the virtual space by either manually placing virtual three-dimensional (3D) objects into the virtual space and/or by using a GenAI module (not shown in FIG. 1) to generate an event layout (with existing floor plans and/or drawings as inputs) automatically. Once the virtual event space layout is generated, the event space may be planned, and the planner may share the layout with the user 114 or 116.

Thereafter, the users 114 or 116 may receive a notification that a new event layout (pertaining to the original request raised) is ready. Specifically, the user 114 or 116 may view entire event plan of the 3D visualization of the virtual event space on the computing device 102 or 104. The user 114 or 116 can view the organized virtual event space and take a decision on whether to approve the event plan. Furthermore, the user 114 or 116 can establish a real-time communication channel with the event planner, enabling collaborative viewing and editing of the event layout within a synchronous and interactive environment. Once satisfied with the event plan, the user 114 or 116 is satisfied with the event plan, the user may provide the approval of the event plan via the computing device 102 or 104.

Various examples, depicting creation of the virtual event space, are described in detail in conjunctions with figures below.

Figure 2:
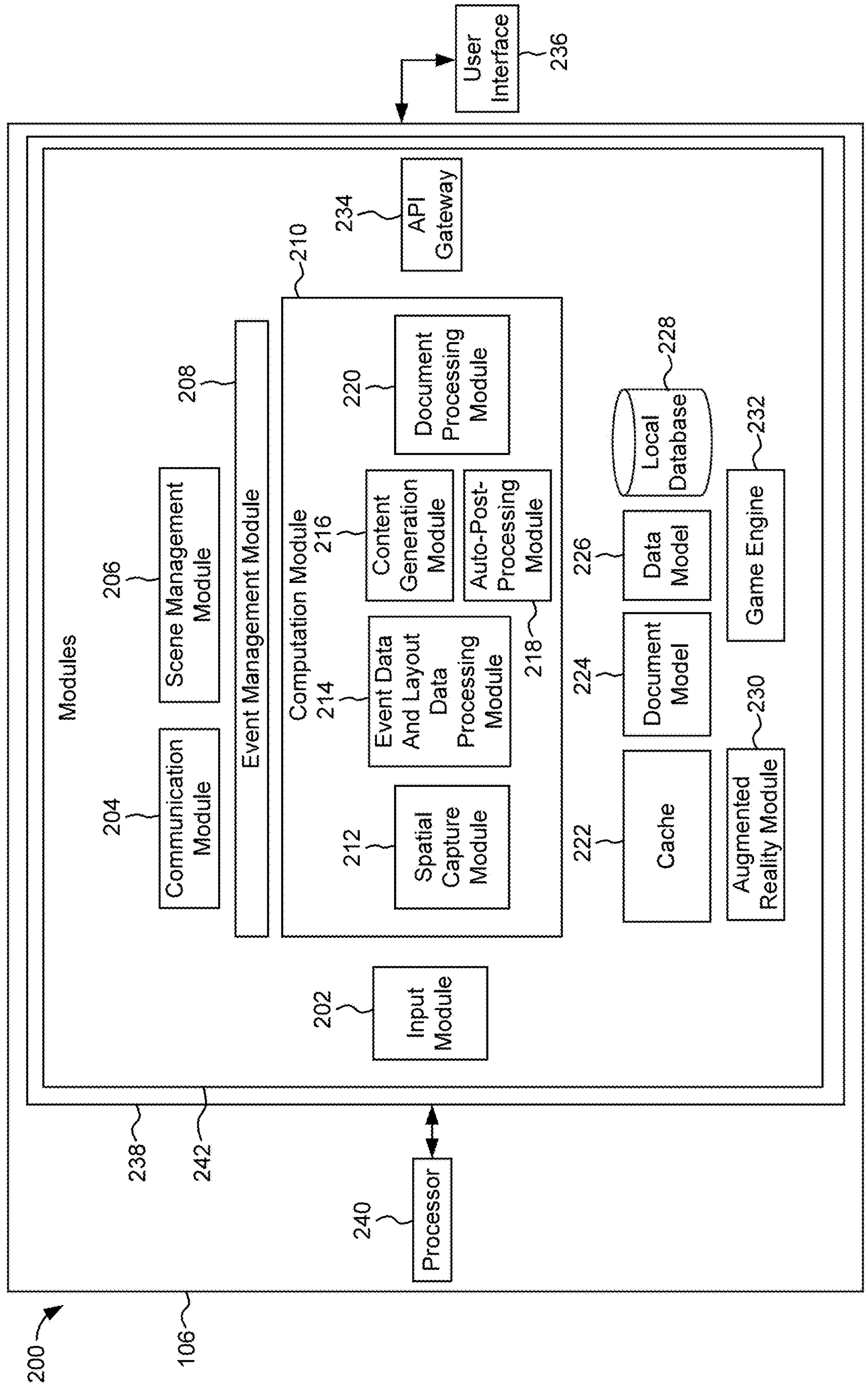
FIG. 2 illustrates an example architecture of a system disclosed in the example environment of FIG. 1, for creating a virtual event space, in accordance with implementations of the present disclosure.

FIG. 2 illustrates an example architecture 200 of the back-end system 106 creating the virtual event space, in accordance with implementations of the present disclosure. The back-end system 106 may include one or more memory 238 storing machine-executable instructions and the one or more processors 240 and a user interface 236. The back-end system 106 may include one or more processors 240 communicably coupled with the one or more memory 238 and configured to execute the machine-executable instructions.

In some examples, the one or more processors 240 may include, but not limited to, microprocessors, microcomputers, hardware processors, microcontrollers, digital signal processors, central processing units, state machines, logic circuits, Application Specific Integrated Circuits (ASICs), Field Programmable Gate Arrays (FPGAs), and/or any devices that manipulate data or signals based on operational instructions. Among other capabilities, the one or more processors 240 may be programmed to cooperate with non-transitory computer-readable instructions stored in one or more memory 238 (also referred to be as computer-readable medium) for performing operations according to the present disclosure. The one or more memory 238 may be non-transitory or non-volatile medium, such as a magnetic disk or solid-state non-volatile memory or volatile medium such as Random Access Memory (RAM), and/or the like.

In some examples, the one or more memory 238 may include modules 242 in the form of programmable instructions executable by the one or more processors 240. The modules 242 may further include an input module 202, a communication module 204, a scene management module 206, an event management module 208, a computation module 210, a cache 222, a document model 224, a data model 226, a local database 228, an augmented reality (AR) module 230, a game engine 232 and an application programming interface (API) gateway 234.

The input module 202 may receive inputs including dimensions of a space, a number of participants, one or more types of the participants, and a set of predefined layouts for the event. Specifically, the input may be provided by the user via the input module 202. Further, the computation module 210 may process said input. The communication module 204 may be provided to process the communication between the application executing on the back-end system 106 and the computing devices (102, 104). The communication module 204 may enable real-time collaboration, allowing multiple users to view and interact with the same AR environment simultaneously. The scene management module 206 may manage the AR scenes, including the loading, unloading, and switching between different scenes or views. The scene management module 206 may further manage the placement and manipulation of virtual objects within the AR environment. The event management module 208 may manage the event lifecycle, including the creation, scheduling, and execution of events. Further, the event management module 208 may track event progress, managing attendees, and generating reports. The computation module 210 may process the received input (by input module 202) and initiate an AR session displaying a plurality of objects in the area of the space. Herein, the plurality of objects may be arranged in a default configuration based upon a layout of the set of the predefined layouts. The layout of the set of the predefined layouts may be identified and selected, by the user based upon the types of participants and the number of participants. The computation module 210 may utilize techniques, such as, spatial analysis and physical simulation, to create a realistic and immersive AR environment.

Moreover, the cache 222 may store pre-generated or frequently used content (for example, 3D models, textures, multimedia assets and the like). The cache 222, thus, may improve performance by reducing the need for on-demand content generation, especially for complex or frequently accessed assets. The document model 224 may represent the structure and content of the event documentation, enabling the back-end system 106 to generate and manage various document formats. Furthermore, the data model 226 may determine the structure and relationships between different data entities, such as event details, participant information, and layout configurations. The data model 226 may facilitates data storage, retrieval, and manipulation within the back-end system 106. The local database 228 may stores event data, user preferences, and other event specific information, thereby ensuring the data availability even in offline or low-connectivity scenarios.

Further, the AR module 230 may provide the underlying framework for the AR session, enabling the back-end system 106 to track the virtual scene orientation, overlay virtual objects and facilitate interactions between the user (114, 116) and the virtual environment (displayed on the user interface 236). Additionally, the game engine 232 may provide an environment for rendering 3D graphics, facilitating user input, and managing the overall AR experience. The game engine 232 may further, provide features like physical simulation and advanced rendering techniques. The API gateway 234 may facilitate communication between the back-end system 106 and the external services, databases and/or computing devices (102, 104). The API gateway 234 may facilitate the back-end system 106 to send and receive data, over the network 110, such as fetching updates, sharing event plans, accessing cloud-based resources or the like.

In further detail, the computation module 210 may further include a spatial capture module 212, an event data and layout data processing module 214, a content generation module 216, an auto post-processing module 218 and a document processing module 220. The spatial capture module 212 may generate virtual image of a real physical space. The spatial capture module 212 may perform, but not limited to, scanning the real physical space, capturing input videos and extracting artefacts from input two-dimensional (2D) images (for example, floor plans, drawings, images or the like). Specifically, scanning the real physical space may include capturing and processing sensory data (e.g., depth images, point clouds) to generate a 3D representation of the physical space. In an example, the spatial capture module 212 may utilize neural radiance fields (NeRF) for scanning the real physical space. NeRF may refer to a technique that represents a scene as a continuous function that maps 3D coordinates to color and density. By training a neural network on a set of images captured from different viewpoints, NeRF may reconstruct a detailed and accurate 3D model of the physical space. NeRF may provide advantages, such as the ability to capture fine-grained details and render novel views of the physical space. Capturing the input videos may include receiving, followed by processing the processed input video streams (corresponding to the physical space) to reconstruct the 3D geometry of the physical space. Moreover, extracting the artefacts may include analyzing 2D images, such as floor plans, drawings, and photographs, to extract relevant spatial information, by utilizing the techniques such as, feature detection and matching, image registration, and 2D-to-3D projection.

Thereafter, the event data and layout data processing module 214 may analyze the virtual image of the physical space captured by the spatial capture module 212 and conduct interpretation to identify key objects, their attributes, and spatial relationships within the virtual image of the captured physical space. The event data and layout data processing module 214 may further include a spatial analyzer 302, spatial-temporal event manager 304 and a surface analyzer 306, explained in further detail in conjunction with FIG. 3. Further, a spatial language may be defined by the event data and layout data processing module 214. Herein, the spatial language may provide a structured framework for interpreting and representing spatial information extracted from the virtual image of the physical space. For instance, the event data and layout data processing module 214 may be able to detect objects like chairs and tables in a given floor plan. The spatial language may include collection of symbols. The symbol may represent set of basic graphical elements (or primitives) that can be used to construct spatial representations. For example, the graphical elements may be chairs, tables, and other furniture elements. The graphical elements may be the fundamental building blocks, representing the basic vocabulary of the spatial language. Moreover, in the spatial language, "collections" may be formed by combining graphical elements based on spatial relationships (for example, adjacency, proximity, containment, or the like). Additionally, production rules may be defined in the special language. Herein, the production rules may define the permissible combinations of the graphical elements and their spatial relationships. The production rules may serve as a grammar of the spatial language, ensuring that only valid configurations are generated. For instance, the production rule may state that a "table" must be adjacent to a "chair" in the hall. In essence, the spatial language may be defined on an abstraction of low-level object detection models, thereby analyzing the spatial information extracted from the physical space.

In an example scenario of organizing a conference in a hall, the graphical elements may include, chair, table, screen, podium, entrance, exit, seating row and presentation zone. The collection of graphical elements may include registration desk (a collection containing a table, chairs, and a sign), lecture hall (a collection consisting of multiple seating rows, a presentation zone, and an entrance/exit) and coffee break area (a collection with tables, chairs, and a coffee machine). Further, the production rules may include "seating row must contain at least 2 chairs", "presentation zone must contain a screen and a podium", "lecture hall must contain at least one presentation zone and multiple seating rows" and "entrance/exit must be positioned at opposite ends of the hall."

Furthermore, the collection of graphical elements may be data structures which are represented as fuzzy co-relational graph-sets. The data structures may include graphical elements, clusters of graphical elements, and the co-relation information between graphical elements and clusters. The fuzzy co-relational graph-set may include collections in the form of a graph, said graph may be expressed as below:

$$G=(P,S,T,L,H),$$

wherein,

P denotes set of all graphical elements (for example chairs, tables or the like);

S denotes the set of all geometric clusters of graphical elements. The clusters may be based on Euclidean distance. However, custom 'distance' functions can also be used;

T denotes a 2D matrix where each element (i, j) ($i^{th}$ row and $j^{th}$ column of the matrix T) represents two functions f(Pi, Pj) and f'(Pi, Pj), where f is the co-relation function between two graphical elements Pi, Pj within a given geometric cluster and f' is the 'dissipation' function which governs the 'strength' of the co-relation between Pi, Pj. Pi and Pj denote the two elements between which the (i, j) element of the matrix T represents two functions f and f';

L denotes a 2D matrix where each element (i, j) represents two functions g(Si, Sj) and g'(Si, Sj), where g is the co-relation function between two clusters Si, Sj within a given fuzzy co-relational graph-set and g' is the 'dissipation' function which governs the 'strength' of the co-relation between Si and Sj; and H denotes a strength function in the form of Strength=H (Pi, Sj) which denotes the strength of the membership of graphical element Pi in cluster Sj.

The data structures may exhibit a fuzzy membership characteristic, implying that elements do not rigidly belong to a single cluster or graph node. Instead, membership is dynamic and context dependent. For instance, if a chair is positioned equidistant from two tables, said chair may belong to both clusters to some degree. The dissipation function (g'), which quantifies the degree of association between elements, would reflect this ambiguity by assigning high values to the chair's membership in both clusters. The fuzzy membership characteristic may be utilized in case of complex or nuanced scenarios. In the example provided, chairs designated for differently abled participants might not conform to the typical chair-table clustering pattern. Fuzzy memberships may allow these exceptions to be analysed without violating the underlying data structure.

In an aspect, the event data and layout data processing module 214 may utilize the spatial language. In an aspect, natural language commands may be received from the user (114, 116) as inputs and converted to spatial language descriptions. For instance, users (114, 116) can raise commands such as "Place the round tables evenly spaced across the room, with chairs surrounding each table", "Position the speaker podium near the front center, but not blocking the view from any table", "Distribute decorative plants near entrances and along the aisles" or the like. The fuzzy co-relational graph-sets may be used to contextually analyze and process terms like 'evenly spaced' and 'near', thereby, generating a flexible, human-like interpretation of the spatial requirements. The contextual analysis may ensure optimal placement based on the unique layout and characteristics of the real physical space, creating a visually appealing and functional setup tailored to the specific needs of any event.

Thereafter, the content generation module 216 may receive the interpreted virtual image of the captured physical space from the event data and layout data processing module 214 and generate 3D models illustrating event layouts and 3D objects. The content generation module 216 is described in detail, in conjunction with FIG. 4. Specifically, the content generation module 216 may auto-generate multiple event layouts in real-time that are free from geometric/spatial anomalies. Followed by the auto-generation of the multiple event layouts, the auto post-processing module 218 may post process the generated 3D models. Specifically, the auto post-processing module 218 may utilize techniques such as automated computational geometry pipeline for 3D model cleanup. Herein, the 3D model cleanup may refer to refining and improving the quality of 3D models by addressing imperfections and inconsistencies that may arise during 3D model creation, acquisition, or processing. The auto post-processing module 218 is described in detail, in conjunction with FIG. 5. The output of the auto post-processing module 218 may persist as a document. The document processing module 220 may handle generation and management of event documentation. Specifically, the document processing module 220 may enable sharing, with a stakeholder of the event, the event plan specifically created for the stakeholder. The event plan may include the area of the space for displaying and receiving further inputs from the stakeholder for finalizing an actual physical event space. In an example, the document processing module 220 may generate reports, presentations, or other documents that capture the event plan, including the virtual layout overlaid on the physical space. Moreover, the document processing module 220 may facilitate real-time co-editing and co-viewing of a given document with the user (114, 116).

The scene management module 206 may customize area of the physical space by adding and configuring digital artifacts for lights, chairs, tables, a stage, wall decorations, and/or speakers in the partial area of the space. Specifically, the scene management module 206 may manage an AR scene, which includes the dynamic placement and manipulation of virtual objects within the real-world environment. The scene management module 206 may enable the user (114, 116) to customize the specific area of the physical space within the AR environment. The user may add various digital artifacts to the AR scene, such as lights, chairs, tables, a stage, wall decorations, and speakers. Additionally, the user may modify the properties of these digital artifacts, such as their position, orientation, size, and/or appearance.

Customizing the area of the physical space may further include converting at least the partial area of the space into a 3D geometry using a GenAI tool or technique. GenAI tools may analyze sensor data (e.g., depth maps, point clouds) captured from the real world and generate a 3D model of the space. The application executing on the back-end system 106 may utilize the back-end system's built-in sensors (like cameras and depth sensors) to capture the real physical space. The captured data may be then processed by the GenAI tools to create a 3D model of the physical space. The 3D geometry representation may provide accurate and detailed model of the space, enabling more precise placement and interaction with virtual objects. Moreover, advanced spatial reasoning and analysis may be facilitated.

In further detail, individual users (of the document) can be considered as 'nodes. The document processing module 220 may utilize a spatial-temporal consistency model (also be referenced to as model) to maintain consistency across nodes. Each user or node may receive a replica of the document, via respective computing devices (102, 104) to edit or view. Consistency of an object, an object cluster and/or of a given time-state are considered. Consistency requirements in this model are fluid and business driven. It is imperative to define what constitutes as read/write operations and how each operation is propagated across different nodes in the back-end system 106. The temporal element in the consistency model adds an extra dimension, i.e., multiple time-states may be accessible by clients. Herein, multiple time-states may refer to the ability of the system to track and manage different versions or snapshots of the data or model over time.

The model may process both spatial and temporal information. The spatial information may include the data describing the position, shape, size, and orientation of objects in space. The temporal information may include data describing when events occur, or the duration of events. A write operation in the model may be defined by the processor 240. Herein, the write operation may refer to any operation that modifies the state of an object, object cluster or a time-state. Further, a read operation may be defined by the processor 240. The read operation may refer to any query which returns the state of an object, object cluster or time-state. Additionally, the semantics of 'consistency' here, may be driven by the given spatial language rules. For example, a notepad kept 'on' a table at a given node may be considered to be consistent with the same notepad object kept 'on' the same table at a different node even if the exact position of the notepad may not be the same (at both nodes). Here, the co-relation 'on' matters rather than the exact position of the notepad. Thus, spatial consistency is driven by the underlying spatial language rules. Temporal consistency may pertain to a time-state of an object or object cluster. The time-state of a given object or object cluster may be either the same across all the participating nodes in the back-end system 106 or may be the case that all the time-states of a given object or object cluster are accessible by all the nodes in the back-end system 106. The consistency requirements may be driven by the underlying spatial language rules and thus, can be adapted well to the requirements.

In an example, consider a node which performs a write operation on its local copy (of the document). The write operation may be then propagated to other nodes in the back-end system 106. A receiving node then puts the write operation in a queue. Each operation in the queue may read sequentially. The write operation may be executed only if, executing said operation changes the state or co-relation of object/objects or clusters in the scene. The write operation which does not change the state or co-relation may be discarded. The discarded operation may be communicated back to the issuing node; thus, the issuing node may be aware that while the exact transformations (or other attributes) of objects in the document may not be the same across nodes, the states and the co-relations have not undergone any change (as a result of the operation taking place). Similarly, the time-state may be made consistent. However, in case all time-states may be preserved (as dictated by the requirements), a different mechanism is implemented. Firstly, all clocks in the distributed system may be synchronized. The synchronization may be obtained by utilizing clock synchronization algorithm. Once the clocks have been synchronized, time-states may be then propagated across nodes and each node may maintains a queue of received/issued time-states. Thus, each node may have a view of all the time-states of a given object or object cluster.

Figure 3:
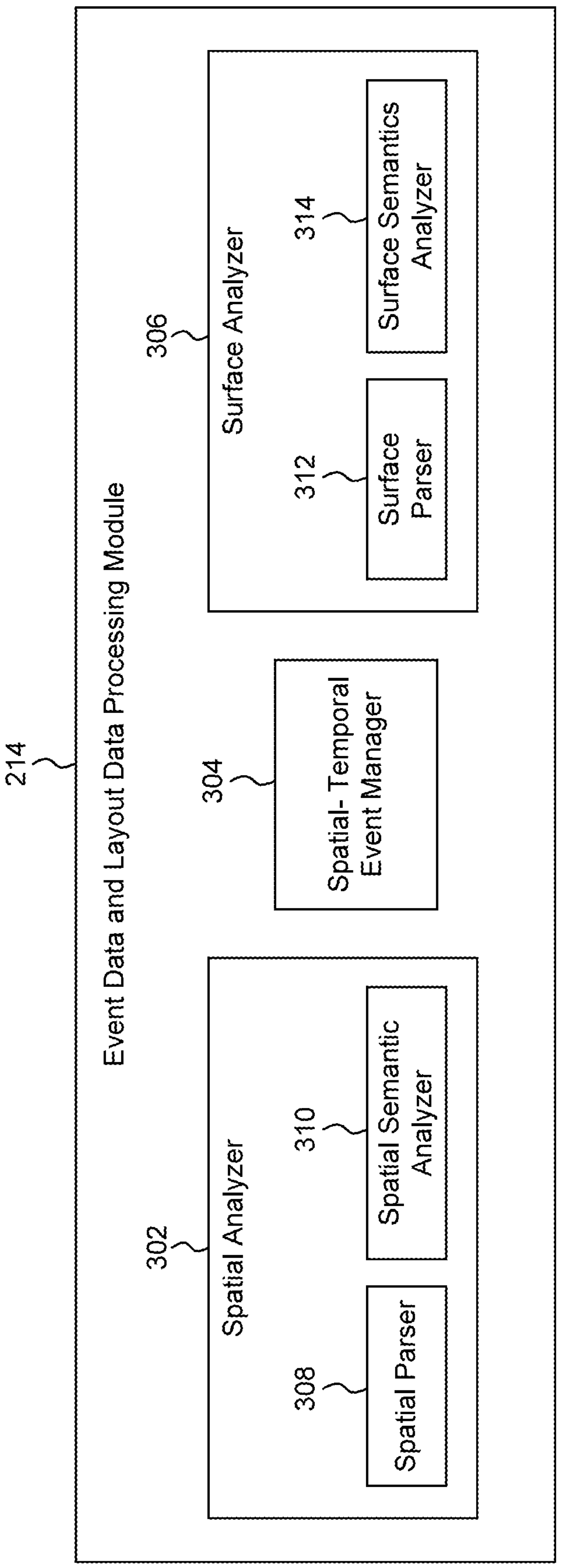
FIG. 3 illustrates a block diagram representation of an event data and layout data processing module, in accordance with implementations of the present disclosure.

FIG. 3 illustrates a block diagram representation of the event data and layout data processing module 214 of FIG. 2, in accordance with implementations of the present disclosure. The event data and layout data processing module 214 may include the spatial analyzer 302, the spatial-temporal event manager 304 and the surface analyzer 306. Further, the spatial analyzer 302 may include a spatial parser 308 and a spatial semantic analyzer 310. Once the event data and layout data processing module 214 receives the virtual image of the physical space by the spatial capture module 212, the spatial analyzer 302 may utilize the spatial language to analyze the spatial information extracted from the virtual image of the physical space. Specifically, the spatial parser 308 may receive fuzzy co-relational graph-set (e.g., a part of the spatial information), which represents a spatial scene with relationships between objects characterized by fuzzy membership values. The spatial parser 308 may de-fuzzify the fuzzy co-relational graph-set, followed by parsing to generate a parsing graph. Herein, the de-fuzzification may include removing the dissipation functions and re-calculating the cluster memberships. Thereafter, the spatial parser 308 may explore multiple parsing paths to generate the parsing graph. Each collection within the input fuzzy co-relational graph-set acts as a starting point for a unique parsing path. Within each parsing path, the spatial parser 308 may analyze the co-relations and the graphical elements within the current collection. Based on the production rules of the spatial language, the spatial parser 308 may generate entries in a parsing table. A collection from the parsing table may be selected and along with the selected collection, all neighbor collections within the same parent collection (a higher-level collection or cluster which contains other collections (or elements) as members) may also be considered, thereby ensuring that the related collections are processed together, maintaining the integrity of the hierarchical structure. Moreover, a higher-level node (parent) may be marked as "resolved" when all its immediate children (sub-collection) and their respective neighbor collections have been fully processed and marked as "resolved", indicating the completion of the processing of the particular branch of the parsing graph. Thereafter, a link may be established between the collection/graphical element with another collection/graphical element if they either have a parent-child relationship or a neighbor relationship. Herein, the link may be referenced to as "edges", created between collection and its child graphical elements. Edges may also be created between neighbor collections. Furthermore, each collection and graphical element may be added as a node to the parsing graph. Each node may be initially assigned a "new" state. The state of the node may be updated to "resolved" only when all its child nodes and neighbor nodes have also been processed and marked as "resolved", thereby ensuring that the entire sub-graph rooted at the current node has been completely processed. In other words, the nodes may represent the graphical elements (for example, individual objects like chairs, tables, screens, etc.), collections (groups of the graphical elements that form meaningful units (for example, "Seating Row," "Presentation Zone")) and/or sub-collections (hierarchical groupings of collections, allowing for multi-level organization of the virtual image of the physical space). Moreover, the edges in the parsing graph may represent the relationships between nodes. The edges may be created between nodes based on the parent relationships. The relationships may include, but not limited to, proximity (physical closeness between objects), orientation (relative positions, for example, "in front of," "to the left of"), hierarchy (parent-child relationships between collections and sub-collections), fuzzy membership (degrees of association between elements of fuzzy co-relational graph-set).

Further, weights may be assigned to the edges connecting collection to their child graphical elements. The weight of the edge may be determined by a de-fuzzified strength function, which quantifies the degree of association or membership between the graphical elements and the collection. Additionally, weights may be assigned to the edges connecting neighbor collection. The weight of the edge between two neighbor collections may be determined by the de-fuzzified dissipation function, which measures the degree of separation or dissimilarity between them, thereby reflecting the extent to which the neighbors are distinct or closely related.

In an example, the spatial parser 308 may utilize top-down parsing strategy to parse the fuzzy co-relational graph-set. In other words, the spatial parser 308 may initiate parsing with the highest-level production rules (for example, "Lecture Hall"–> "Presentation Zone"+"Seating Rows") and thereafter, the spatial parser 308 may de-fuzzify the input fuzzy co-relational graph-set into a hierarchical structure that conforms to production rules. The parsing graph may include structured representation of the virtual image of the physical space, capturing the spatial relationships and organizational hierarchy. The parsing graph generated by the spatial parser 308 may adhere to all the production/grammar rules of the pre-defined spatial language.

Furthermore, the spatial semantic analyzer 310 may interpret the complex spatial information (for example "chairs are usually placed near round tables in the scene") encoded within the parsing graph. The interpretation may include analyzing the relationships between the graphical elements as represented in the parsing graph. The analysis may further include reasoning about spatial concepts such as proximity, orientation, hierarchy, or the like. The spatial semantic analyzer 310 may utilize the spatial language production rules to guide the interpretation process. By comparing the parsed information with the defined rules, the spatial semantic analyzer 310 may identify and flag potential anomalies or inconsistencies. In essence, the spatial semantic analyzer 310 may interpret the spatial relationships within the parsing graph and ensure that the generated layouts are semantically meaningful and consistent with the defined spatial language rules. By detecting and correcting anomalies, the spatial semantic analyzer 310 may facilitate the generation of high-quality and user-friendly spatial arrangements.

Furthermore, the spatial-temporal event manager 304 may extract and process both spatial and temporal information. The spatial information may refer to the spatial data, such as locations, dimensions, and the arrangement of objects within the event space. The temporal information may refer to the time-related aspects of the event, for example start/end times, schedules, deadlines, and time-bound activities. Specifically, the input received by the spatial capture module 212 may include both spatial and temporal information (sent further to be processed by the event data and layout data processing module 214). The spatial-temporal event manager 304 may integrate the spatial and temporal information to create a comprehensive representation of the event, considering both spatial relationships and temporal dependencies. The spatial-temporal event manager 304 may attach "time state" information to dynamic elements, enabling it to track and manage changes in their configuration over time. The time state information may represent the temporal state of dynamic elements within the event. In an example, the time state information may include the tracked changing configuration of a podium over time.

In an example of requirement of "dynamic podium" where configuration or shape needs to be modified during the event. To process the dynamic behavior, the user may attach the "time state" information to the podium, thereby tracking the podium's configuration at different points in time. The time state information may allow the back-end system 106 to represent the podium's changing shape and configuration over the course of the event, including by way of an example, recording modifications to its size, height, or the arrangement of its components. Based on the recorded time states, the user may predict future configurations of the podium, enabling proactive adjustments to the event plan. Moreover, specific actions or notifications may be triggered based on changes in the podium's time state. For example, if the podium is reconfigured, the back-end system 106 may automatically adjust the lighting, sound, or seating arrangements to accommodate the new configuration.

In further detail, the time state information may include aspects like, but not limited to, time granularity, nature of change, weightage and entropy. Herein, time granularity may define the level of detail at which temporal changes are tracked. For instance, high granularity may imply capturing changes at frequent intervals (e.g., every second or millisecond), suitable for rapidly evolving objects. Lower granularity may be sufficient for objects with slower or less frequent changes. Moreover, the nature of change may define a type of change occurring in the object's state. For example, modifications to the object's physical form, such as resizing, folding, or adding/removing components (e.g., the podium's height or the arrangement of its shelves), changes in the object's location, rotation, or orientation within the event space and/or changes in the state of media associated with the object, such as playing, pausing, stopping, or switching between different media files (e.g., audio, video, documents). Further, the weightage may quantify the effort associated with transitioning from one object state to another. For example, changing the height of the podium may be more resource-intensive than moving it to a different location. Thus, weightage information may optimize event planning and resource allocation. Furthermore, the entropy may refer to the degree of disorder or randomness in the object's state or its relationship with other objects. For example, a well-organized and structured arrangement of objects (e.g., a neatly arranged seating area) has lower entropy compared to a chaotic and disorganized arrangement. In essence, the time state information may facilitate tasks such as resource allocation, risk assessment, and real-time event management.

The surface analyzer 306 may analyze the 3D models generated (by the content generation module 216) within the back-end system 106 related to the nature, properties, and characteristics of the surfaces, to customizing the partial area of the space. The surface analyzer 306 may utilize techniques such as machine learning algorithms, computer vision techniques (e.g., edge detection, feature extraction), or geometric analysis methods to classify and characterize surfaces. The surface analyzer 306 may generate a surface property map or a set of descriptors that capture the essential characteristics of each surface region. Specifically, the surface analyzer 306 may include a surface parser 312 and a surface semantics analyzer 314. Further, a surface language may be defined by the surface analyzer 306. The surface language may refer to the formal representation of rules and constraints governing the acceptable geometric properties and relationships of surfaces within the 3D model. The surface analyzer 306 may analyze the geometric properties of the 3D models, extract relevant features (for example, polygons, edges, vertices), and compare them against the defined surface language rules. The surface language primarily deals with geometric data, focusing on the properties and relationships of surfaces at a granular level, including, but not limited to, polygon level, edge level and vertex level. The polygon level may include properties of individual polygons (for example, area, shape, orientation, or the like). The edge level may include properties of edges (for example, length, curvature, connectivity, or the like). The vertex level may include properties of vertices (for example, position, valence, or the like). The surface language definitions may enable the specification and enforcement of rules governing the arrangement and connectivity of polygons. The rules may be used to validate the quality of 3D models, identify and correct errors or inconsistencies, and ensure that the models adhere to specific design requirements. Moreover, the surface language may facilitate translation of the 3D models into a specialized data structure, known as a multi-dimensional augmented explosion graph. The multi-dimensional augmented explosion graph may include flow vectors. The flow vectors may direct entities with a well-defined start and end point. Further, the flow vectors may represent the flow or progression of geometric information across the surface of the 3D model. The multi-dimensional augmented explosion graphs may be specialized data structures, said graph may be expressed as below:

$$M=(V,E,P,F,S)$$

wherein,

M denotes the multi-dimensional augmented explosion graphs;

V denotes the sets of vertices in the given 3D model;

E denotes the sets of edges in the given 3D model;

P denotes the sets of polygons in the given 3D model;

F denotes the sets of all polygon flow vectors; and

S denotes the sets of all polygon clusters.

Furthermore, said flow vectors (F) may represent the specific locations within the 3D space and may include starting and ending points. The flow vector (F) may be expressed as below:

$$F=(v_s,v_e)$$

wherein, $v_s$ denotes the starting vertex of the flow vector; and $v_e$ denotes the ending vertex of the flow vector.

By anchoring the flow vector to specific points on the 3D model, the vector may determine contextual information about the origin and destination, thereby determining the flow of geometric information across the surface. The start and end points of the flow vector may define a specific direction and orientation in 3D space. The directional information may facilitate analyzing the flow of curves, edges, or other geometric features across the surface. Additionally, the flow vectors may be used to represent the connectivity and topological relationships between different parts of the 3D model. By analyzing the flow vectors, the overall structure and organization of the surface may be inferred.

In further detail, the surface parser 312 may receive a multi-dimensional augmented explosion graph as input, said graph may be data structure representing the 3D model's surface geometry and connectivity. The multi-dimensional augmented explosion graph may utilize the flow vectors to capture the directional relationships between polygons and clusters. The surface parser 312 may utilizes a multi-path parsing strategy to explore different possible interpretations of the surface. The multi-path parsing strategy may be utilized as the surface parsing can be non-linear and may include multiple valid interpretations. The surface parser 312 may randomly selects the next available cluster for processing. All neighbor clusters associated with the selected cluster are also processed concurrently. The cluster (or its parent/super-cluster) may be marked as "resolved" when all its neighbor clusters and child clusters have been successfully processed. In an example, each polygon cluster (s) within the graph may serve as a starting point for a unique parsing path. For instance, if the parent parsing table is n-dimensional, each "sub-parsing table" generated during the process may have a dimensionality of n−1 (or less). The reduction in dimensionality may reflects the progressive refinement of the parsing process as different aspects of the surface may be explored. Moreover, each flow vector (along with its associated polygons) within a cluster may be considered and used to create individual entries in the parsing table. The entries may be generated based on the predefined production rules of the surface language.

The multi-dimensional augmented explosion graph may include edges representing link between clusters/polygons if there exists the flow vector connecting them. The links may represent the directional relationships between the surface elements. When parsing the cluster or polygon, the flow vector leading to the "next" cluster/polygon may be analyzed. If a corresponding dimension exists in the parsing table to represent the direction of this flow vector (e.g., a dimension for flow vectors parallel to the x-axis), an entry may be added to that dimension. The value of the entry may be proportional to the length of the flow vector, reflecting the significance of that particular flow direction. Moreover, each cluster and polygon may be assigned a state. Initially, all nodes may be in the "new" state. The state of the node may be updated to "resolved" only when all the connected clusters/polygons have also been processed and marked as "resolved." Additionally, parsing paths may be extracted from the parsing table by starting at the source cluster and following nodes that have a corresponding entry (connection) in the parsing table, thereby effectively tracing the flow of information through the surface.

The surface semantics analyzer 314 may determine the meaning and function of different surface regions within the space. For example, surface semantics analyzer 314 may may identify functional areas (for example, seating areas, stage areas, circulation paths, or the like), surface types (for example, walls, floors, ceilings, windows, or the like) and object placements.

Figure 4:
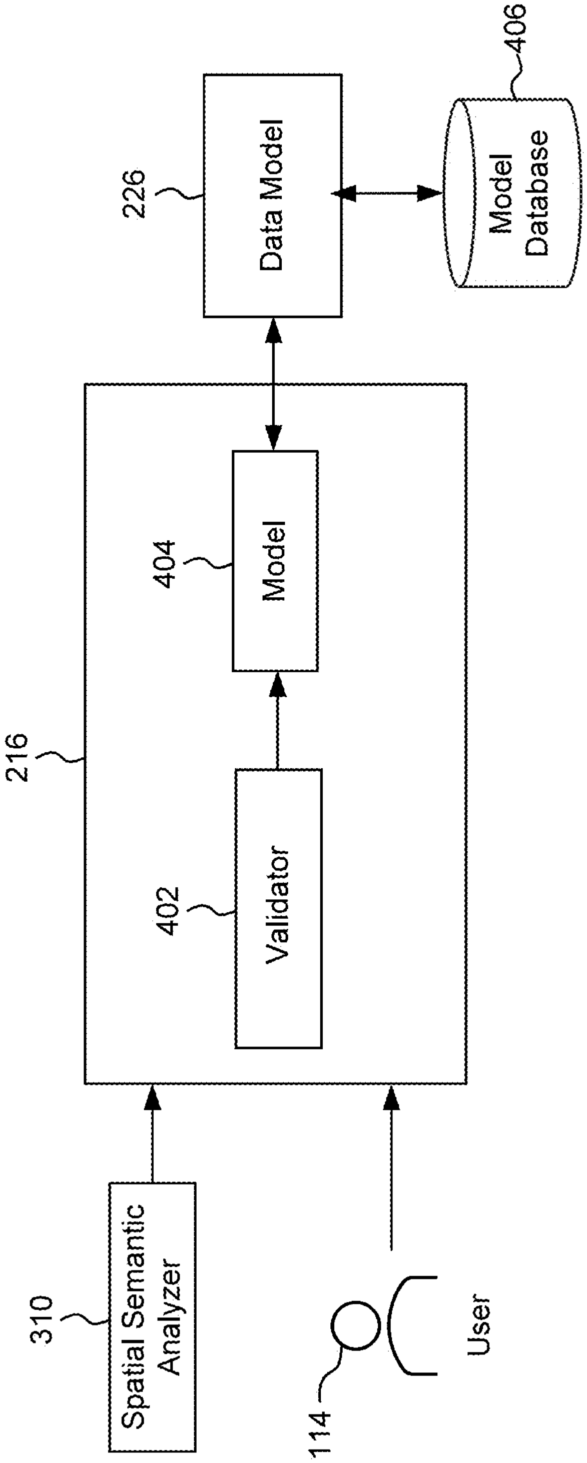
FIG. 4 illustrates a block diagram representation of a content generation module, in accordance with implementations of the present disclosure.

FIG. 4 illustrates a block diagram representation of the content generation module 216 of FIG. 2, in accordance with implementations of the present disclosure. The content generation module 216 may further include a validator 402 and a model 404. The content generation module 216 may receive inputs from the spatial semantic analyzer 310 and/or user to auto-generates multiple event layouts in real-time that are free from geometric/spatial anomalies. The geometric anomalies may include overlapping objects, incorrect object placements, or violations of physical constraints (for example, objects exceeding room boundaries). The spatial anomalies may include violations of spatial rules, such as incorrect object proximities or inappropriate object groupings (for example, chairs placed too far from tables). Further, the input from the user may include, but not limited to, event specifications, room constraints and style preferences. The event specifications may include details about the event, such as the number of attendees, the purpose of the event, and any specific requirements or preferences. The room constraints may include information about the available space, including dimensions, layout, and any existing fixtures. The style preferences may include user preferences regarding the overall style and aesthetic of the layout (for example, formal, informal, minimalist or the like). The validator 402 may manipulate spatial relationships using formal logic and symbolic reasoning. Additionally, the model 404 may generate layouts. The content generation module 216 may utilize the analyzed output from the spatial semantic analyzer 310 to validate generated layouts from the model 404. The validation process performed by the validator 402 may include, but not limited to, intra-cluster spatial co-relation validation, inter-cluster spatial co-relation validation and validation against overall scene intent. Specifically, the intra-cluster spatial co-relation validation may include verifying for spatial anomalies occurring within the confines of a single cluster. For example, "A table is placed on top of a chair" within a seating area cluster would be considered an anomaly as it violates the expected spatial arrangement within the cluster. The intra-cluster spatial co-relation validation may include applying constraints on object positions, orientations, and distances within a cluster. For instance, chairs within a seating row should be aligned, and tables should be positioned at an appropriate distance from the chairs. Further, the inter-cluster spatial co-relation validation may examine the spatial relationships between objects across different clusters and check for anomalies that occur between objects belonging to different clusters. For example, "Audience chairs are placed on top of the speaker's stage" would be an anomaly as it violates the expected spatial separation and hierarchy between these two distinct functional areas. The inter-cluster spatial co-relation validation type of validation may include analyzing the relative positions, orientations, and distances between clusters. Additionally, the inter-cluster spatial co-relation validation may include checking for appropriate spatial separations and hierarchies between different functional areas within the event space. The validation against overall scene intent may refer to evaluating the generated layout in relation to the overall purpose or intent of the event. For example, if the event is designed for a single speaker, any layout that includes multiple speaker chairs would be considered invalid as the intended purpose of the event is not fulfilled. The said validation may compare the generated layout to predefined templates or using rule-based systems to assess the suitability for the intended event type. In essence, by performing said various levels of validation, the validator 402 may identify and filter out layouts containing spatial anomalies, ensuring that the generated layouts are not only geometrically correct but also syntactically and semantically meaningful and appropriate for the intended event scenario.

The filtered layouts may be utilized by the data model 226 to train/re-train the underlying models, such as, large language models (LLMs). Specifically, the data model 226 may be communicably coupled to a model database 406. Moreover, the model database 406 may include one or more LLMs (also be referenced to as GenAI models, foundation models, and/or the like). In an implementation, the LLMs may include pre-trained LLMs or generated LLMs. The pre-trained LLMs may be general-purpose GAI models like large deep learning neural networks, which may be trained using a broad range of generalized and unlabelled training data to perform one or more tasks, such as, human computer interactions (i.e., question and answering), automating process execution, process planning, generating step-by-step procedures for the process execution, performing data analysis, and/or the like. While implementations of the present disclosure are described in further detail herein with non-limiting reference to the LLMs, it is contemplated that implementations of the present disclosure may be realized using any appropriate foundation models or Machine Learning (ML) models, or Artificial Intelligence (AI) models. The model 404 may learn from the anomalies and improve ability to generate more accurate and realistic layouts. Additionally, the data model 226 may refine the rules and constraints used by the validator 402, thereby ensuring the continuous improvement of spatial relationships and event planning.

Figure 5:
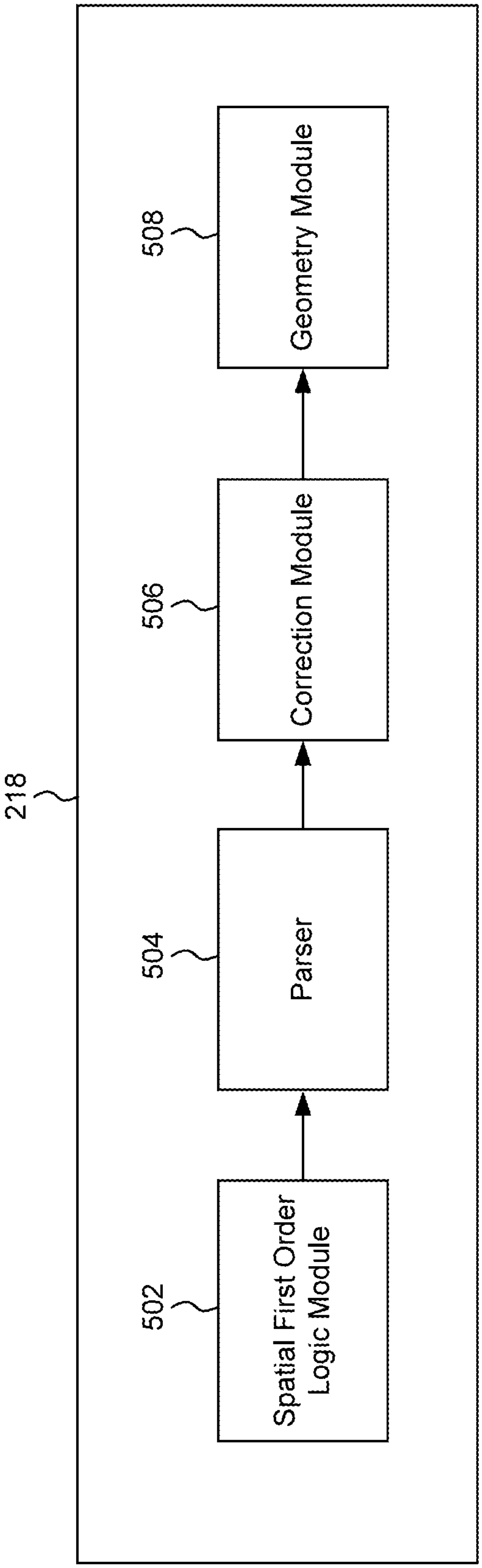
FIG. 5 illustrates a block diagram representation of an auto post-processing module, in accordance with implementations of the present disclosure.

FIG. 5 illustrates a block diagram representation of the auto post-processing module 218, in accordance with implementations of the present disclosure. The auto post-processing module 218 may include a spatial first order logic module 502, a parser 504, a correction module 506 and a geometry module 508. The auto post-processing module 218 may utilize the techniques such as automated computational geometry pipeline for 3D model cleanup by considering surface characteristics and expected surface flow patterns into account. The spatial first order logic module 502 may include rules defining spatial and geometric transformations at a high level of abstraction by considering the intended purpose or function of the 3D model. The key components of said rules may include but not limited to, logical symbols, variables, quantifiers, intent, and executors. Specifically, the logical symbols may represent fundamental spatial relationships and concepts. For example, the logical symbols such as "next-to", "close-to", "attached-with", or the like, may describe proximity and adjacency between geometric entities. The logical symbols such as "along-flow-vector" may represent a direction and flow of geometric information across the surface. The logical symbols such as "in-frontof", "behind", or the like, may describe relative positions and orientations. Further, the variables may represent the various geometric entities within the 3D model, for example, polygons (triangles, quads, etc.), vertices (individual points on the surface), edges (connections between vertices), clusters (groups of related polygons or other geometric entities.) or the like. The quantifiers may represent relationships over sets of entities for all vertices in polygon, for all vertices in model, for some edges, or the like. The intent may capture an intended purpose or function of a particular geometric feature or relationship. The executer may refer to generic transformations that may be applied to graphical elements, collections, or clusters to correct or modify the 3D model. For example, "remove vertex," "remove cluster," "make edge coherent," and/or the like.

Further, the parser 504 may receive the rules defined in the spatial first order logic module 502 as input. The rules may be further parsed followed by, analyzing the logical expressions, and extracting the necessary information to generate corrective actions. Thereafter, based on the parsed rules, the correction module 506 may generate a set of corrective actions. The corrective actions may further refine or adjust based on user input or additional constraints. The geometry module 508 may then apply the generated corrective actions to the 3D geometry, resulting in the final, corrected 3D model. Specifically, the corrective actions may implement specific executors depending on the nature of the geometric errors and the desired outcomes. For example, the executor "FillHole(vertex1, vertex2, vertex3)" may identify and fill holes in the mesh by creating new faces to connect the specified vertices, the executer "MergePolygons(polygon1, polygon2)" may merge two adjacent polygons into single polygon.

Figure 6:
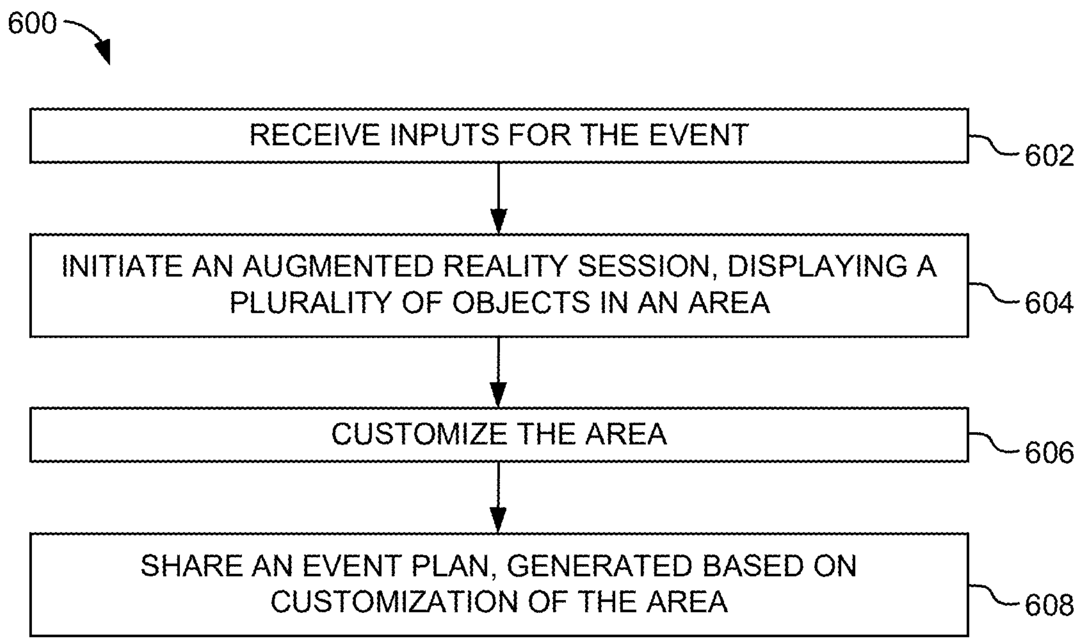
FIG. 6 illustrates the flow diagram of an example method implemented by the system to create the virtual event space, in accordance with implementations of the present disclosure.

FIG. 6 illustrates a flow diagram of an example computer-implemented method 600 implemented by the back-end system 106 to create a virtual event space, in accordance with implementations of the present disclosure. In some examples, the method 600 may be executed using the one or more processors 240 disclosed in related to FIGS. 1-5.

The computer-implemented method 600 may include receiving 602 inputs for the event. The input may include dimensions of a space, a number of participants, one or more types of the participants, and a set of predefined layouts for the event.

The computer-implemented method 600 may include initiating 604 an augmented reality session displaying the plurality of objects in at least a partial area of an event space. Herein, the plurality of objects may include objects arranged in default configuration based upon a layout of the set of the predefined layouts. The layout of the set of the predefined layouts may be identified and selected based upon the types of participants, and the number of participants. Moreover, initiating the augmented reality session may include generating a three-dimensional (3D) video of the partial area of the space by extracting artefacts from two-dimensional (2D) images of the space.

The computer-implemented method 600 may include customizing 606 at least the partial area of the space by adding and configuring digital artifacts for lights, chairs, tables, a stage, wall decorations, and/or speakers in the partial area of the space.

The computer-implemented method 600 may include sharing 608, with a stakeholder of the event, an event plan specifically created for the stakeholder. The event may include at least the customized partial area of the space for displaying and receiving further inputs from the stakeholder for finalizing an actual physical event space.

Implementations of the present disclosure provide technical solutions to multiple technical problems that arise in the context of creating a virtual event space. For example, the spatial capture module 212 may accurately represent the physical environment within the AR session. By employing a combination of techniques, including real-time 3D scanning, video processing, and 2D image analysis, the spatial capture module 212 may provide a robust foundation for the accurate placement and interaction of virtual objects within the real world. The use of advanced techniques like NeRF further enhances the accuracy and detail of the captured environment, leading to a more immersive and realistic AR experience.

The spatial language defined by the event data and layout data processing module 214 may processing complex spatial information and capture the underlying semantics without the need for implementing complex computational geometry algorithms. The special language may further facilitate capturing associative/compositive relationships between the constituent elements.

Further, by incorporating the time state information, the spatial-temporal event manager 304 may enable the back-end system 106 to effectively handle dynamic elements and adapt to changing conditions during the event, leading to more flexible and responsive event management. Specifically, the time state information may provide a comprehensive representation of the dynamic behavior of objects within an event. By capturing details such as time granularity, nature of change, change weightage, and entropy, the back-end system 106 can effectively manage and adapt to evolving conditions, leading to more efficient and optimized event planning and execution.

Moreover, in the present disclosure, the surface language may provide a mechanism for translating 3D models into the multi-dimensional augmented explosion graph. Instead of conventional vectors, said multi-dimensional augmented explosion graph may utilize flow vectors. The flow vectors may provide structured and informative representation of surface relationships compared to traditional vectors. The flow vectors may explicitly capture the direction and progression of geometric features, enabling accurate analysis and manipulation of the 3D model.

Furthermore, utilization of the multi-dimensional augmented explosion graph, flow vectors, and a multi-path search strategy by the surface analyzer 306 facilitate the analysis of complex surface geometries. By exploring different parsing paths and leveraging the directional information encoded in the flow vectors, the surface analyzer 306 can generate a comprehensive and nuanced understanding of the 3D model's surface structure.

Figure 7A:
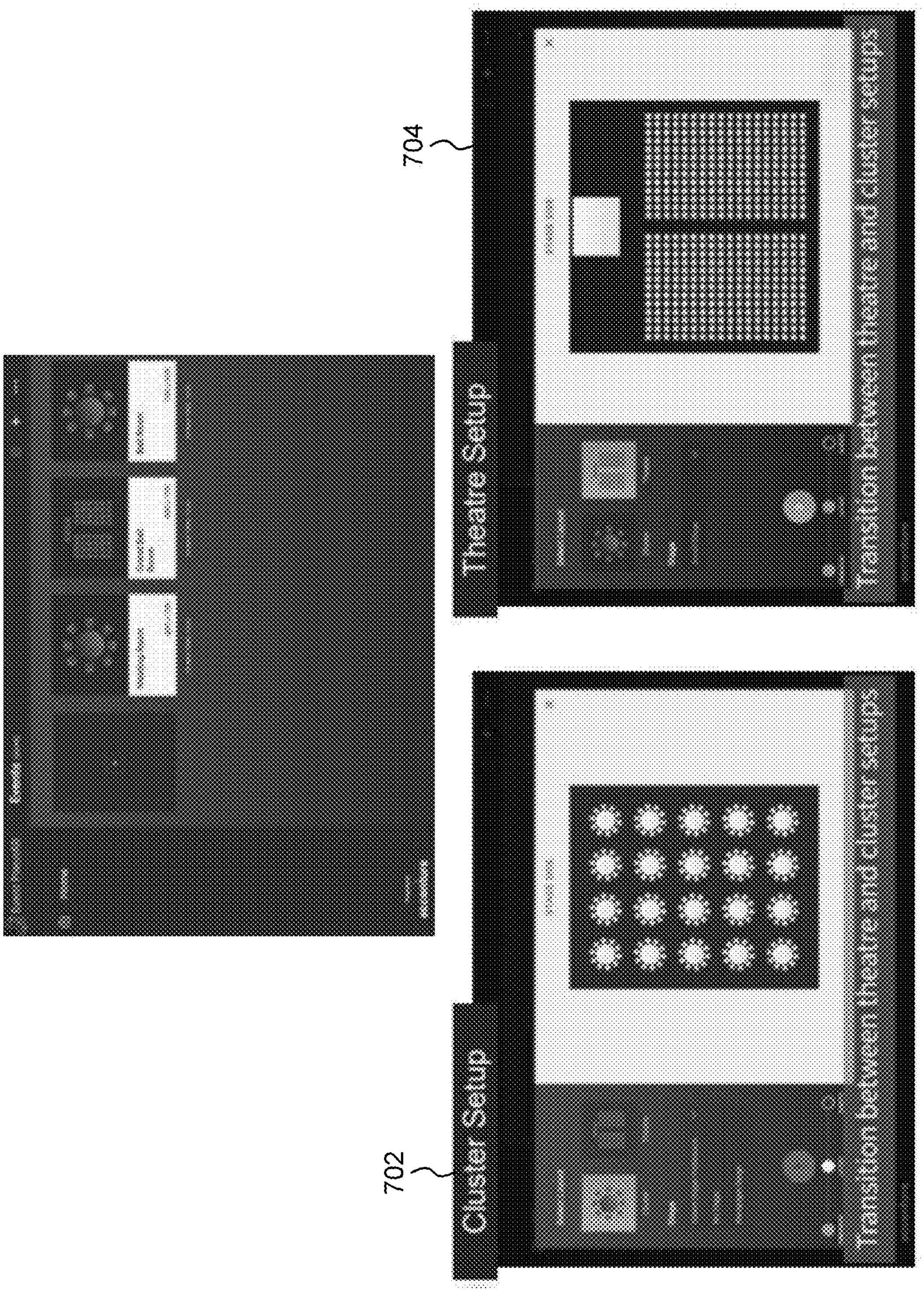
FIGS. 7A-7B illustrate an example user workflow (on the user interface), in accordance with implementations of the present disclosure.
Figure 7B:

FIGS. 7A-7B illustrate an example user workflow (on the user interface 236), in accordance with implementations of the present disclosure. Referring to FIG. 7A, the user 114 or 116 may begin by logging into the application and landing on the dashboard. The dashboard may provide options for creating new events or viewing existing events. The user 114 or 116 may select between two primary event setup options: "Cluster Setup 702" and "Theatre Setup 704". The selection may determine the default layout and configuration options for the event. Referring to FIG. 7B, the user 114 or 116 may enter an interactive environment where they can visualize and plan the event setup in real-time using Augmented Reality (AR). At this stage the user 114 or 116 may visualize, plan and interact. Specifically, the user 114 or 116 may see the event space (706, 708, 710 and 712) with the selected layout applied. Further, the user 114 or 116 may modify and customize the layout by adding, removing, or repositioning elements such as chairs, tables, decorations, and equipment. Additionally, the user 114 or 116 may experiment with different configurations to find the optimal setup for the event.

Figure 8:
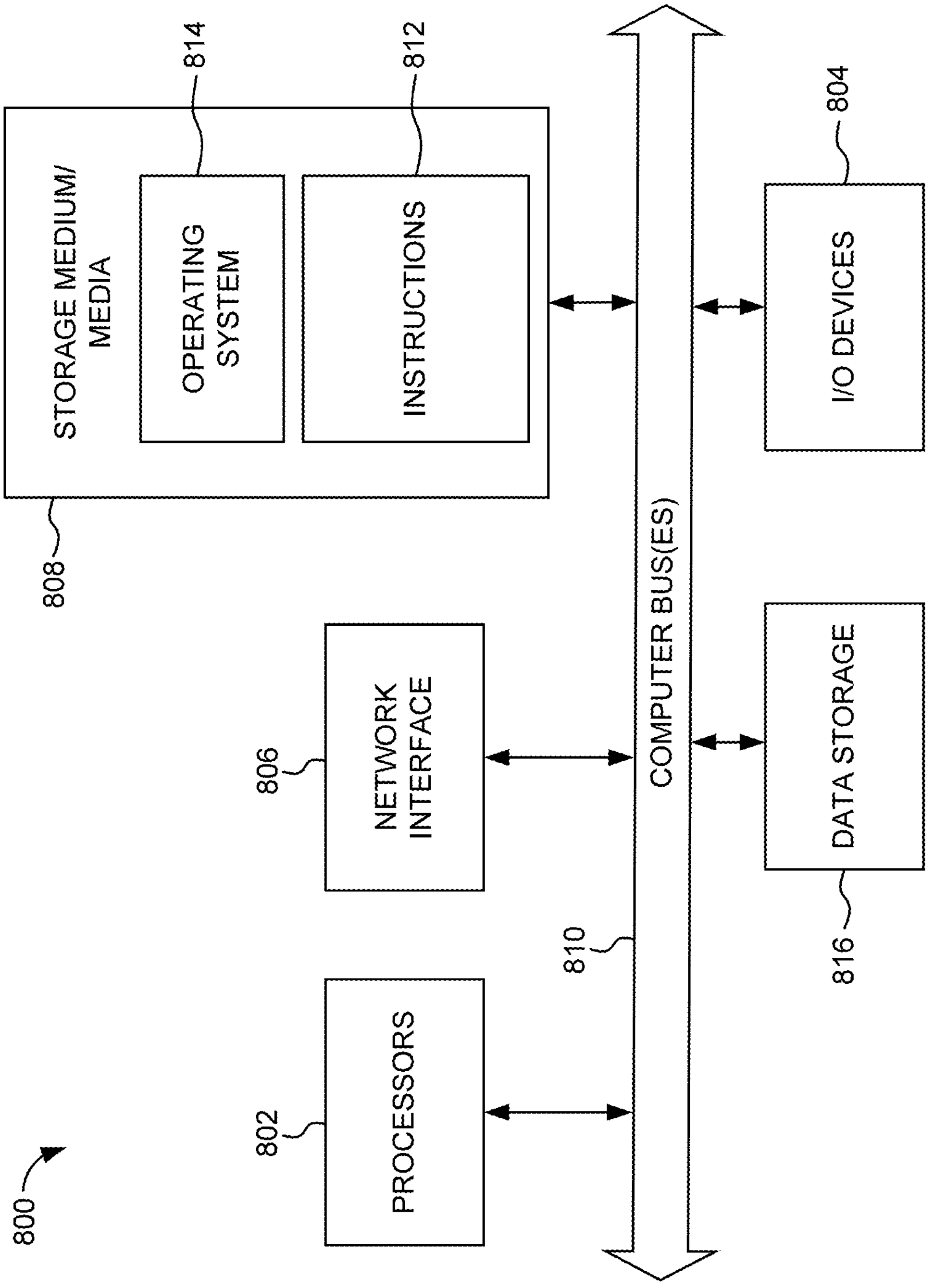
FIG. 8 illustrates a computer system that may be used to implement the system for creating the virtual event space, in accordance with implementations of the present disclosure.

FIG. 8 illustrates a computer system 800 that may be used to implement the back-end system 106 disclosed in the example environment of FIG. 1. for creating virtual event space, in accordance with implementations of the present disclosure. More particularly, computing machines such as desktops, laptops, smartphones, tablets, and wearables which may be used to implement the tasks that may have the structure of the computer system 800. The computer system 800 may include additional components not shown and that some of the process components described may be removed and/or modified. In another example, a computer system 800 may be deployed on external-cloud platforms such as cloud, internal corporate cloud computing clusters, organizational computing resources, and/or the like.

The computer system 800 includes processor(s) 802, such as a central processing unit, ASIC or another type of processing circuit, input/output devices 804, such as a display, mouse keyboard, etc., a network interface 806, such as a Local Area Network (LAN), a wireless 502.11x LAN, a 3G or 4G mobile WAN or a WiMax WAN, and a computer-readable medium 808. Each of these components may be operatively coupled to a bus 810. The computer-readable medium 808 may be any suitable medium that participates in providing instructions to the processor(s) 802 for execution. For example, the computer-readable medium 808 may be non-transitory or non-volatile medium, such as a magnetic disk or solid-state non-volatile memory or volatile medium such as RAM. The instructions or modules stored on the computer-readable medium 808 may include machine-readable instructions 812 executed by the processor(s) 802 that cause the processor(s) 802 to perform the methods and functions of the system for creating virtual event space.

The system may be implemented as software stored on a non-transitory processor-readable medium and executed by the processors 802. For example, the computer-readable medium 808 may store an operating system 814, such as MAC OS, MS WINDOWS, UNIX, or LINUX, and code for the system. The operating system 814 may be multi-user, multiprocessing, multitasking, multithreading, real-time, and the like. For example, during runtime, the operating system 814 is running and the code for the system is executed by the processor(s) 802.

The computer system 800 may include a data storage 816, which may include non-volatile data storage. The data storage 816 stores any data used or generated by the system.

The network interface 806 connects the computer system 800 to internal systems for example, via a LAN. Also, the network interface 806 may connect the computer system 800 to the Internet. For example, the computer system 800 may connect to web browsers and other external applications and systems via the network interface 806.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term computing system encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touchpad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for creating a virtual event space for acceptance and adoption, the computer-implemented method comprising:

receiving inputs including dimensions of a space, a number of participants, one or more types of the participants, and a set of predefined layouts for the event;

initiating an augmented reality session displaying a plurality of objects in at least a partial area of the space, wherein the plurality of objects includes one or more objects arranged in a default configuration based upon a layout of the set of the predefined layouts, wherein the layout of the set of the predefined layouts is identified and selected based upon the one or more types of participants, and the number of participants;

customizing at least the partial area of the space by adding and configuring one or more digital artifacts for lights, chairs, tables, a stage, wall decorations, and/or speakers in the partial area of the space; and sharing, with a stakeholder of the event, an event plan specifically created for the stakeholder, wherein the event plan includes at least the customized partial area of the space for displaying and receiving further inputs from the stakeholder for finalizing an actual physical event space.

2. The computer-implemented method of claim 1, wherein initiating the augmented reality session displaying the plurality of objects in at least the partial area of the space comprises generating a three-dimensional (3D) video of at least the partial area of the space by extracting artifacts from two-dimensional (2D) images of the space.

3. The computer-implemented method of claim 2, wherein initiating the augmented reality session displaying the plurality of objects in at least the partial area of the space further comprises automatically generating the layout of the set of the predefined layouts using a spatial parser and a spatial semantic analyzer.

4. The computer-implemented method of claim 1, wherein customizing at least the partial area of the space comprises customizing at least the partial area of the space by converting at least the partial area of the space into a digital three-dimensional (3D) geometry using a generative artificial intelligence (GenAI) tool or technique.

5. The computer-implemented method of claim 4, wherein customizing at least the partial area of the space further comprises customizing at least the partial area of the space using a spatial parser and a spatial semantic analyzer.

6. The computer-implemented method of claim 4, wherein customizing at least the partial area of the space further comprises customizing at least the partial area of the space using a surface parser and a surface semantics analyzer.

7. The computer-implemented method of claim 1, wherein customizing at least the partial area of the space comprises customizing at least the partial area of the space using a spatial-temporal event manager.

8. A system for creating a virtual event space for acceptance and adoption, the system comprising:

at least one memory configured to store machine executable instructions; and at least one processor communicatively coupled with the at least one memory and configured to execute the machine executable instructions to perform operations comprising:

receiving inputs including dimensions of a space, a number of participants, one or more types of the participants, and a set of predefined layouts for the event;

initiating an augmented reality session displaying a plurality of objects in at least a partial area of the space, wherein the plurality of objects includes one or more objects arranged in a default configuration based upon a layout of the set of the predefined layouts, wherein the layout of the set of the predefined layouts is identified and selected based upon the one or more types of participants, and the number of participants;

customizing at least the partial area of the space by adding and configuring one or more digital artifacts for lights, chairs, tables, a stage, wall decorations, and/or speakers in the partial area of the space; and sharing, with a stakeholder of the event, an event plan specifically created for the stakeholder, wherein the event includes at least the customized partial area of the space for displaying and receiving further inputs from the stakeholder for finalizing an actual physical event space.

9. The system of claim 8, wherein initiating the augmented reality session displaying the plurality of objects in at least the partial area of the space comprises generating a three-dimensional (3D) video of at least the partial area of the space by extracting artefacts from two-dimensional (2D) images of the space.

10. The system of claim 9, wherein initiating the augmented reality session displaying the plurality of objects in at least the partial area of the space further comprises automatically generating the layout of the set of the predefined layouts using a spatial parser and spatial semantic analyzer data.

11. The system of claim 8, wherein customizing at least the partial area of the space comprises customizing at least the partial area of the space by converting at least the partial area of the space into a digital three-dimensional (3D) geometry using a generative artificial intelligence (GenAI) tool or technique.

12. The system of claim 11, wherein customizing at least the partial area of the space further comprises customizing at least the partial area of the space using a spatial parser and spatial semantic analyzer data.

13. The system of claim 11, wherein customizing at least the partial area of the space further comprises customizing at least the partial area of the space using a surface parser and a surface semantics analyzer.

14. The system of claim 8, wherein customizing at least the partial area of the space comprises customizing at least the partial area of the space using a spatial-temporal event manager.

15. A non-transitory computer-readable medium (CRM) comprising machine-executable instructions, which, when executed by at least one processor of a computing device configured for creating a virtual event space for acceptance and adoption, cause the computing device to perform operations comprising:

receiving inputs including dimensions of a space, a number of participants, one or more types of the participants, and a set of predefined layouts for the event;

initiating an augmented reality session displaying a plurality of objects in at least a partial area of the space, wherein the plurality of objects includes one or more objects arranged in a default configuration based upon a layout of the set of the predefined layouts, wherein the layout of the set of the predefined layouts is identified and selected based upon the one or more types of participants, and the number of participants;

customizing at least the partial area of the space by adding and configuring one or more digital artifacts for lights, chairs, tables, a stage, wall decorations, and/or speakers in the partial area of the space; and sharing, with a stakeholder of the event, an event plan specifically created for the stakeholder, wherein the event includes at least the customized partial area of the space for displaying and receiving further inputs from the stakeholder for finalizing an actual physical event space.

16. The non-transitory CRM of claim 15, wherein initiating the augmented reality session displaying the plurality of objects in at least the partial area of the space comprises generating a three-dimensional (3D) video of at least the partial area of the space by extracting artefacts from two-dimensional (2D) images of the space.

17. The non-transitory CRM of claim 16, wherein initiating the augmented reality session displaying the plurality of objects in at least the partial area of the space further comprises automatically generating the layout of the set of the predefined layouts using a spatial parser and spatial semantic analyzer data.

18. The non-transitory CRM of claim 15, wherein customizing at least the partial area of the space comprises customizing at least the partial area of the space by converting at least the partial area of the space into a digital three-dimensional (3D) geometry using a generative artificial intelligence (GenAI) tool or technique.

19. The non-transitory CRM of claim 18, wherein customizing at least the partial area of the space further comprises customizing at least the partial area of the space using a spatial parser and spatial semantic analyzer data.

20. The non-transitory CRM of claim 18, wherein customizing at least the partial area of the space further comprises customizing at least the partial area of the space using a surface parser and a surface semantics analyzer, and/or a spatial-temporal event manager.

* * * * *